United States Patent
Sukup

(10) Patent No.: US 8,123,452 B2
(45) Date of Patent: Feb. 28, 2012

(54) PRE-SPREAD DEVICE FOR GRAIN SPREADER

(75) Inventor: Eugene G. Sukup, Hampton, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 764 days.

(21) Appl. No.: 11/866,434

(22) Filed: Oct. 3, 2007

(65) Prior Publication Data

US 2008/0101897 A1    May 1, 2008

Related U.S. Application Data

(60) Provisional application No. 60/863,742, filed on Oct. 31, 2006.

(51) Int. Cl.
*B65G 65/32* (2006.01)
(52) U.S. Cl. .................. 414/301; 239/687; 414/299
(58) Field of Classification Search ............... 414/195, 414/299, 301; 239/687
See application file for complete search history.

(56) References Cited

U.S. PATENT DOCUMENTS

| | | | | |
|---|---|---|---|---|
| 3,064,833 A | * | 11/1962 | Von Ruden | 414/301 |
| 3,682,394 A | * | 8/1972 | Shivvers | 239/665 |
| 3,791,592 A | * | 2/1974 | Cobb | 239/666 |
| 3,902,610 A | | 9/1975 | Sukup | |
| 3,966,124 A | * | 6/1976 | Sukup | 239/666 |
| 4,397,423 A | * | 8/1983 | Beaver et al. | 239/684 |
| 4,430,521 A | * | 2/1984 | Ofield et al. | 174/663 |
| 5,238,035 A | * | 8/1993 | Poussin et al. | 141/286 |
| 5,403,141 A | * | 4/1995 | Rauser | 414/301 |
| 6,094,869 A | * | 8/2000 | Magoon et al. | 49/460 |
| 6,147,306 A | * | 11/2000 | Wilkins | 174/58 |

* cited by examiner

*Primary Examiner* — James Keenan
(74) *Attorney, Agent, or Firm* — Zarley Law Firm, P.L.C.

(57) ABSTRACT

A grain spreading device that uses a pre-spreading device within a cone shaped guide to provide uniform distribution of grain. Specifically, the pre-spreading device has an opening therein such that a distance between the opening and the outer periphery of the pre-spreading device forms a shelf to direct grain toward the opening to provide a uniform distribution of the grain. Additionally, the pre-spreading device can have laser cut knockouts to adjust the pre-spreading device to a plurality of different spreading devices.

6 Claims, 6 Drawing Sheets

PRE-SPREAD DEVICE FOR GRAIN SPREADER

CROSS REFERENCE TO RELATED APPLICATION

This application claims the benefit of U.S. Provisional Application No. 60/863,742 filed Oct. 31, 2006.

BACKGROUND OF THE INVENTION

This invention is directed toward a pre-spread device for a grain spreader and more particularly to a pre-spread ring that results in a more uniform spread pattern.

Grain spreaders are well known in the art. As examples, U.S. Pat. Nos. 3,902,610 and 3,966,124 to Sukup, incorporated by reference herein in their entirety, disclose conventional grain spreaders. To enhance the spread pattern of a grain spreader, it is desirable to distribute or drop the grain toward the center of the spreader since a transport auger generally drops grain toward one side of the spreader. Presently, to assist in distributing grain toward the center of the grain spreader a pre-spread funnel is mounted to the top of the spreader. While the funnel assists in distributing grain toward the center, there are deficiencies that can be improved on in the art. For one, the funnels are expensive to manufacture and add to the cost of the spreader. Also, the attachment of the funnel is generally not secured to the spreader and on occasion the funnel can either fall or blow off. In addition, because the funnel sometimes is mounted to the top of the spreader, the funnel extends beyond the opening of the bin and the bin lid cannot be closed. Finally, because the funnel is spaced apart from the spreader pan, the distribution of the grain is not optimized.

Therefore, an object of the present invention is to provide a pre-spread device that is easier and less costly to manufacture.

A further object of the present invention is to provide a pre-spread device that optimizes the uniform distribution pattern of grain from a grain spreader.

A still further object of the present invention is to provide a pre-spreading device that is more securely attached and does not interfere with the lid of a bin.

These and other objectives will be apparent to one of skill in the art based on the following disclosure.

BRIEF SUMMARY OF THE INVENTION

A grain spreading device having a shaft within a housing. A cone shaped guide is connected to the housing wherein a pre-spreading device is within the guide and supported by a support bracket. Said pre-spreading device has an opening therein where a distance between the opening and the outer periphery of the pre-spreading device forms a shelf that guides grain toward the opening to provide a uniform distribution of grain.

DETAILED DESCRIPTION OF THE PREFERRED EMBODIMENT

Figure 1:
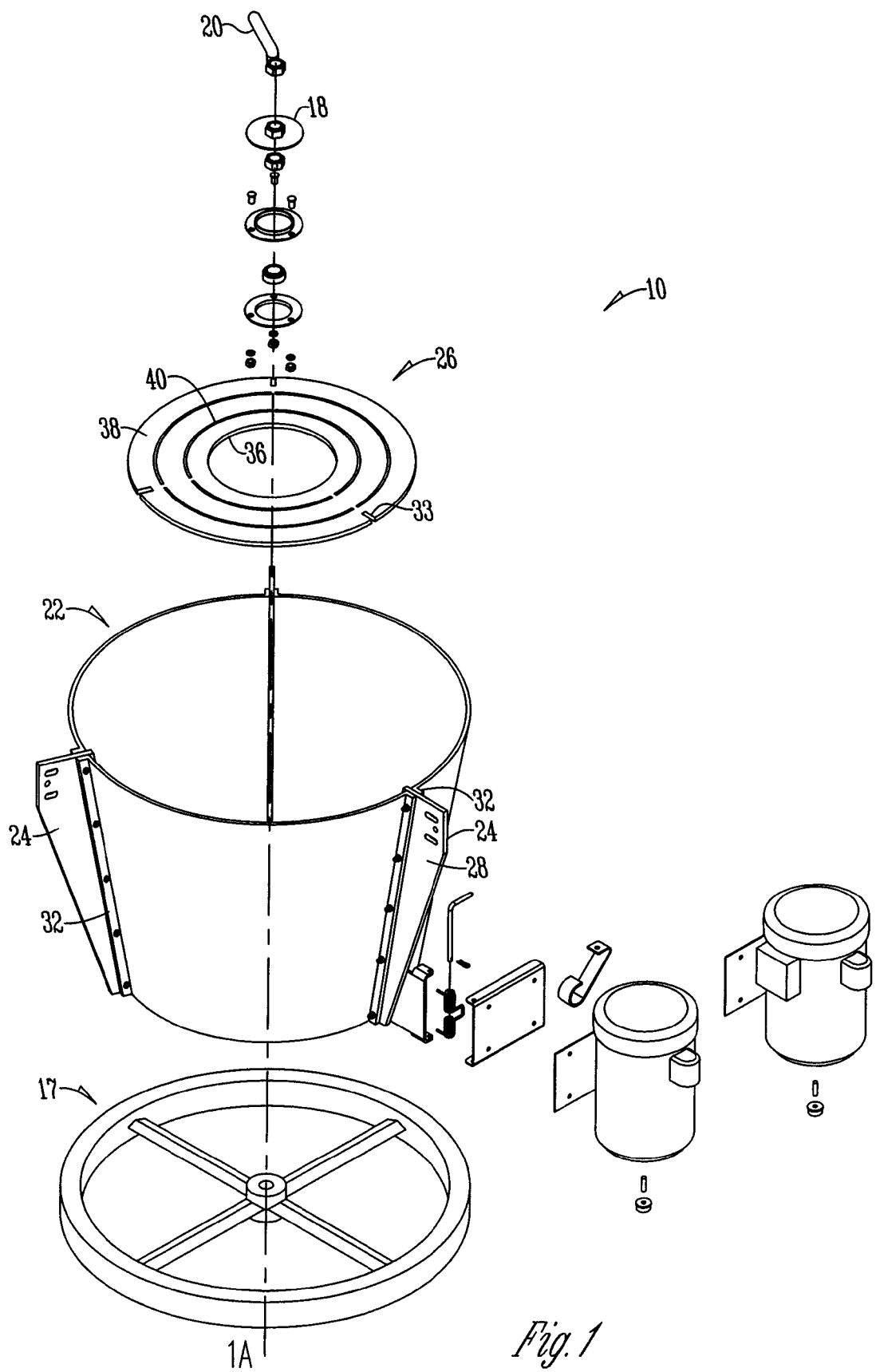
FIG. 1 is an exploded perspective view of a spreading device with a pre-spreader.
Figure 1B:
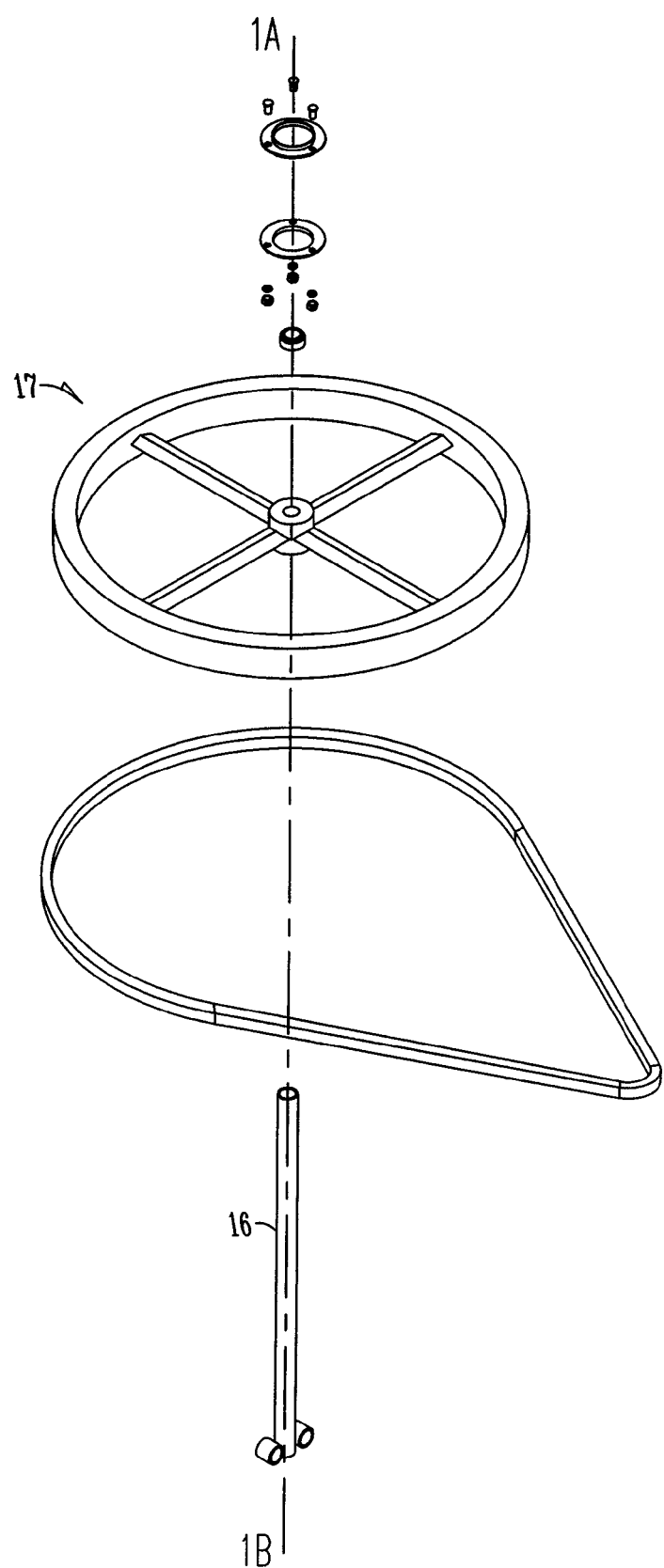
FIG. 1B is an exploded perspective view of a spreading device with a pre-spreader that is a continuation of FIG. 1.
Figure 1C:
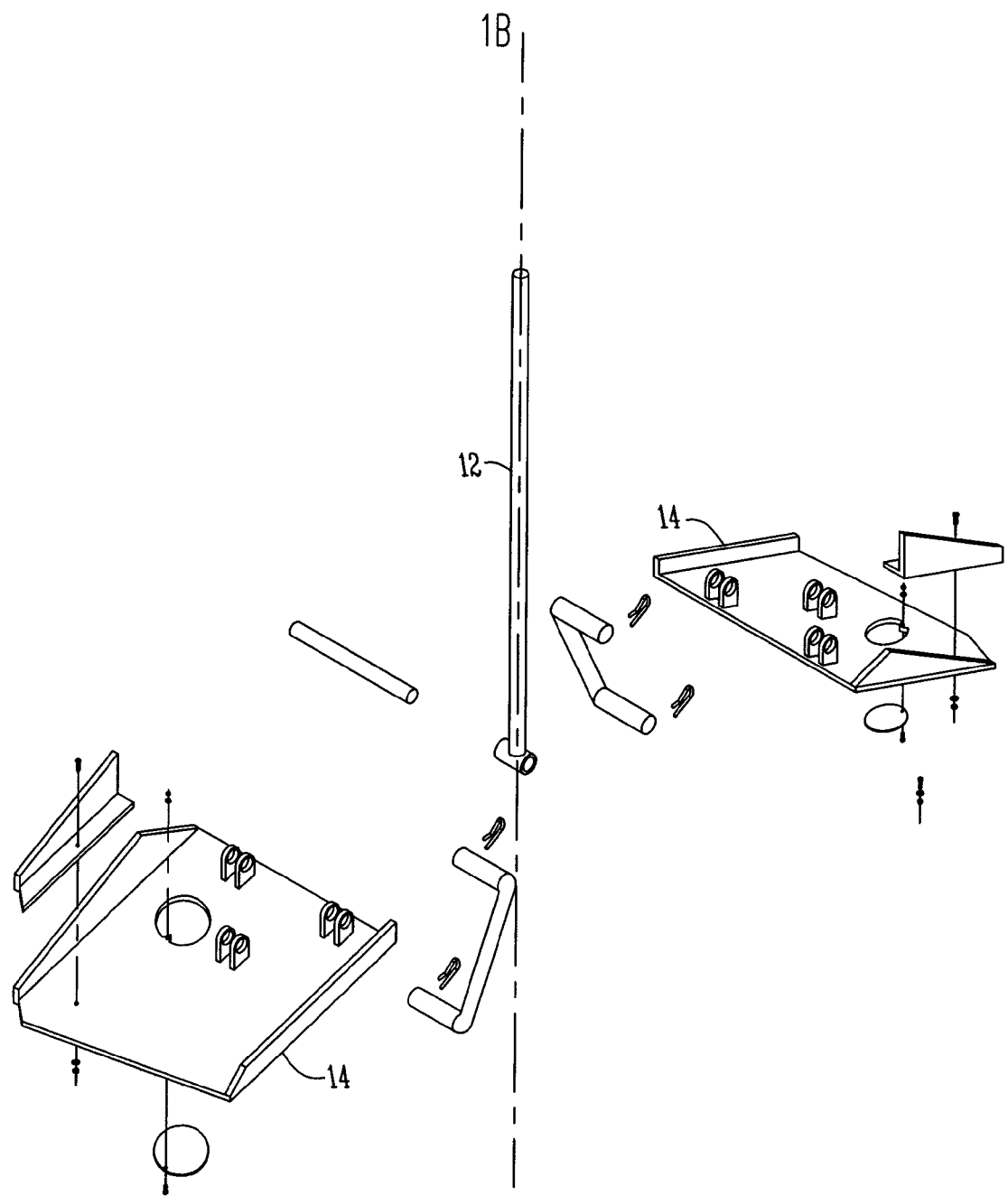
FIG. 1C is an exploded perspective view of a spreading device with a pre-spreader that is a continuation of FIGS. 1 and 1B.
Figure 2:
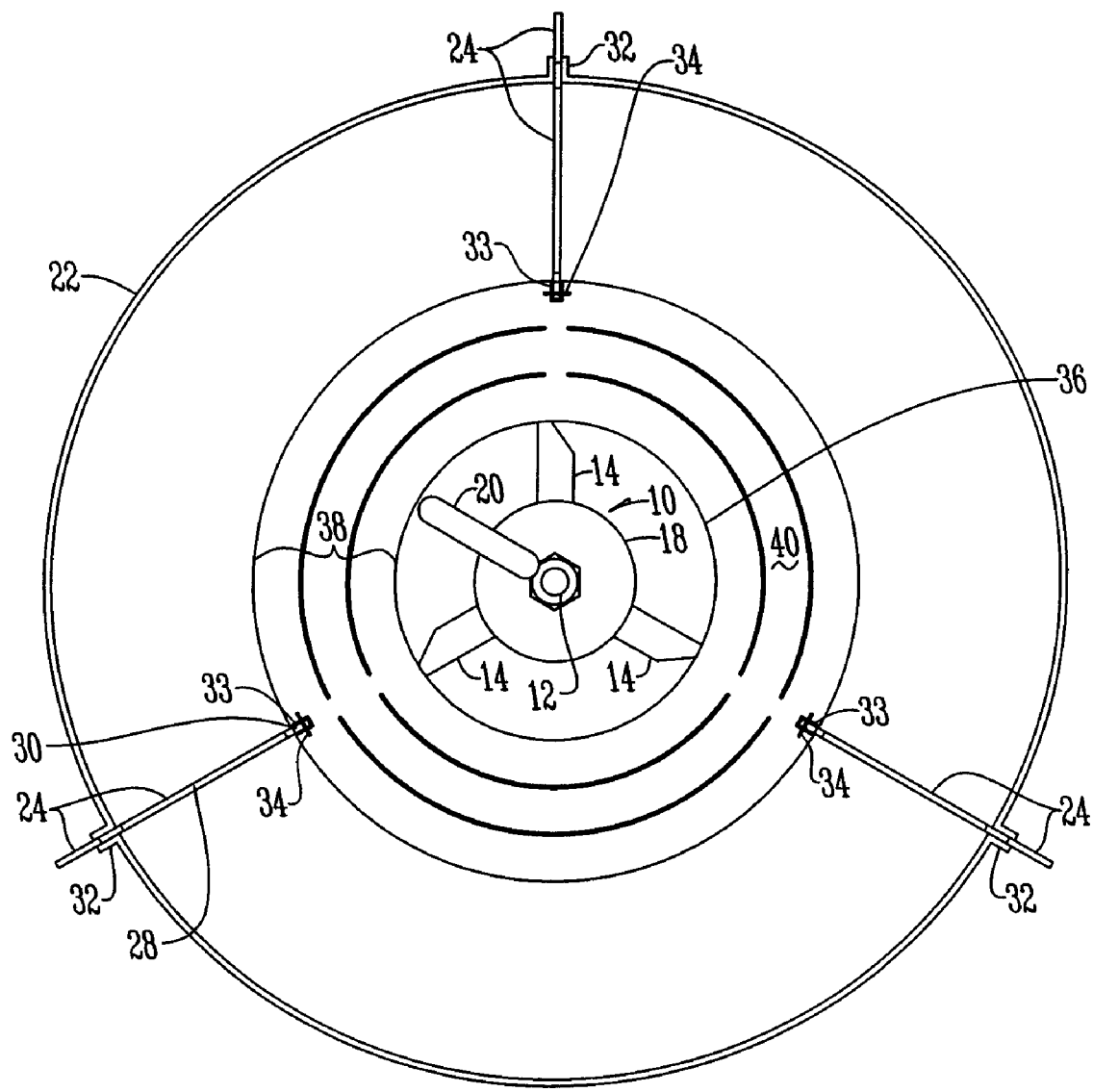
FIG. 2 is a top plan view of a spreading device with a pre-spreader.
Figure 3:
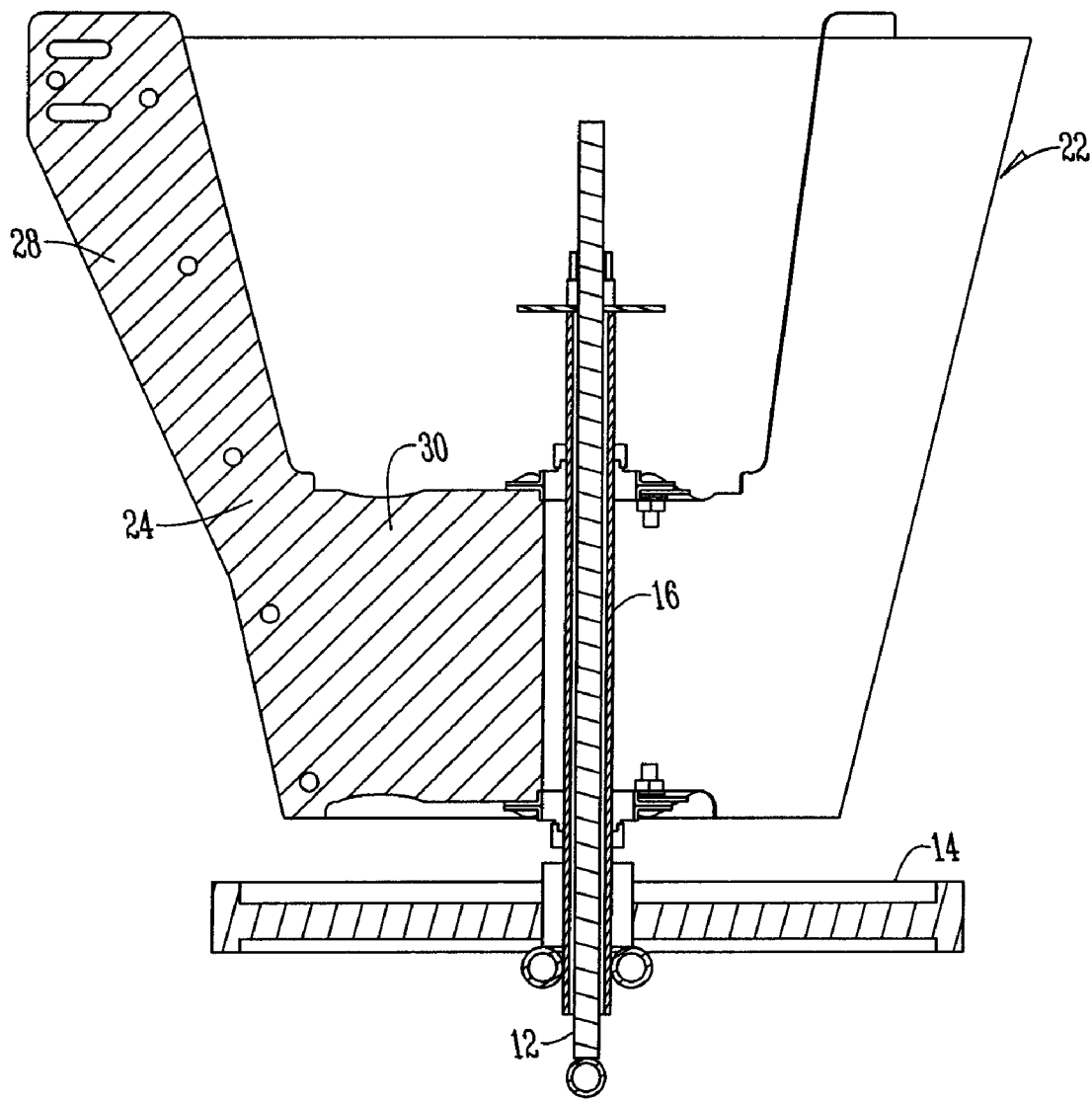
FIG. 3 is a sectional view of a spreading device.
Figure 4:
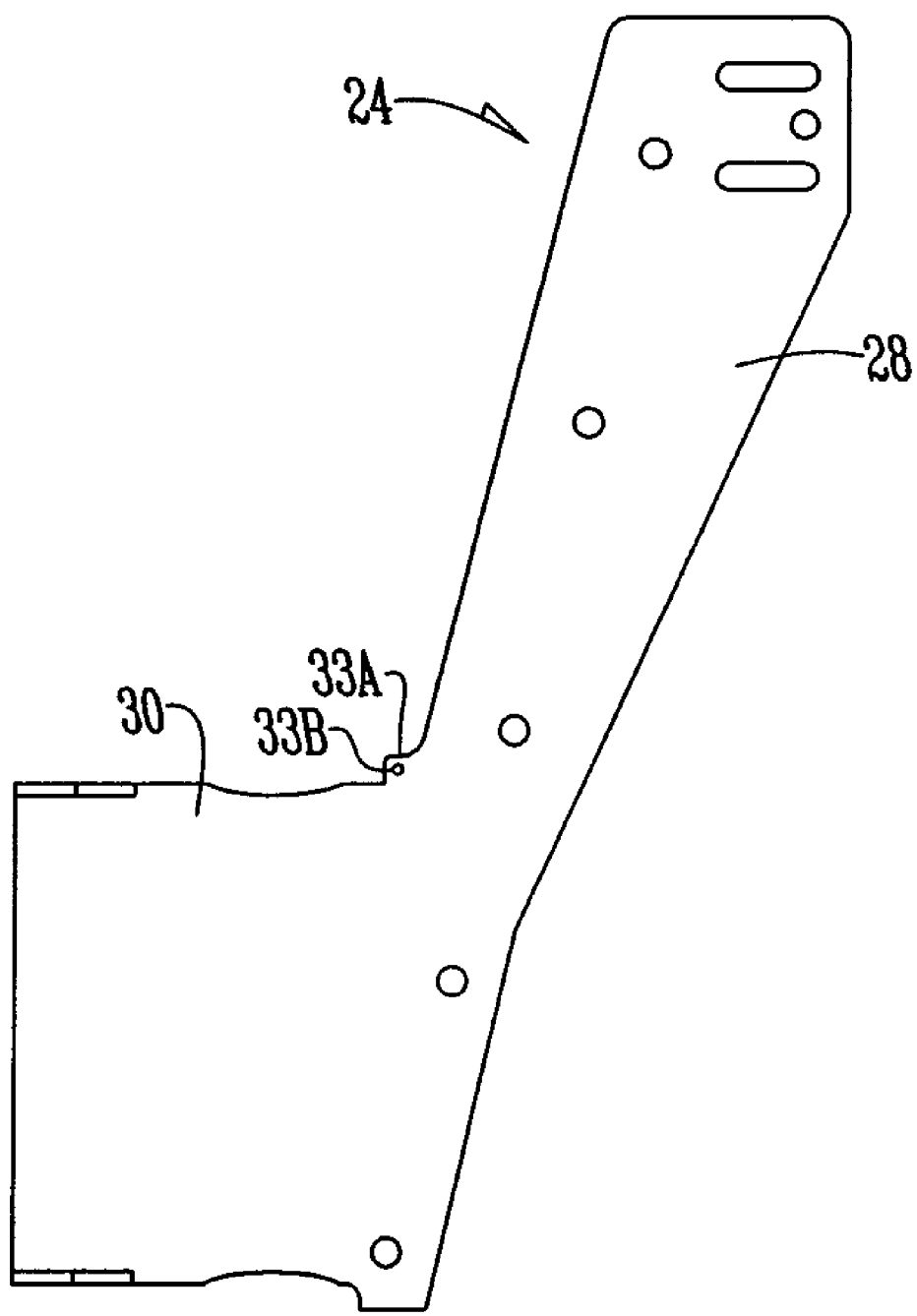
FIG. 4 is a side view of a support bracket.

Referring to the Figures, a conventional spreader 10 is shown having a centrally located shaft 12 upon which a pair of pans or fins 14 are pivotably mounted. Slidably positioned over the shaft 12 is a bearing tube 16 that extends through spreader pulley 17. Threadably mounted on the shaft 12 is a distribution disc 18 and a locking nut handle 20.

Improved features of the spreader include a cone shaped guide 22 made of multiple pieces bolted together, generally L-shaped support brackets 24, and a pre-spreading device 26. The support brackets 24 have a generally vertical portion 28 and a generally horizontal portion 30. The horizontal portion 30 is secured within the cone shaped guide 22 to form a strut adjacent the bottom of guide 22. The pieces of the guide 22 are generally arcuate in shape and have flanges 32 on each end that extend outwardly and align with the vertical portion 28 of the support bracket 24 so that the pieces of the guide 22 may be connected to the support bracket 24. When the pieces of the guide 22 are connected to the support bracket 24, part of the vertical portion 28 of the support bracket 24 extends into the interior area of the guide 22.

The pre-spreading device 26 is of any shape and size and preferably is a cylindrical ring or disc. The pre-spreading device 26 is positioned within the interior of the guide 22 and is supported by the horizontal portion 30 of the support bracket 24. To more securely attach the pre-spreading device 26 to the spreader 10, a plurality of slots 33 are formed on the outer periphery of ring 26 that receive part of the vertical portion 28 of the support bracket 24. The vertical portion 28 extends into a ridge 33A having a hole 33B positioned above ring 26 that receives a pin 34. Pin 34 holds ring 26 in place.

The pre-spreading device 26 has a central opening 36 through which grain is distributed to the fins 14. The distance between the central opening 36 and the outer periphery of the pre-spreading device 26 forms a shelf 38 that helps guide grain toward the opening 36 to provide more uniform distribution to the fins 14. In an alternative embodiment, the shelf 38 is angled in a downward direction from the outer periphery to the central opening 36 to facilitate grain distribution.

The central opening 36 is sized to fit a similarly sized auger (not shown). To adjust the pre-spreading device 26 for use with different sized augers, the shelf 38 has laser cut knock-outs 40 that allow portions of the shelf 38 to be broken off to create a larger diameter opening 36 for use with a larger auger.

It will be appreciated by those skilled in the art that other various modifications could be made to the device without parting from the spirit and scope of this invention. All such modifications and changes fall within the scope of the claims and are intended to be covered thereby.

What is claimed is:

1. A grain spreading device comprising:
   a cone shaped guide;
   a disc within the guide and supported by a support bracket; and
   said disc having an opening therein through which grain is distributed where a distance between the opening and an outer periphery of the disc forms a shelf that guides grain toward the opening to provide a uniform distribution of grain within the grain spreading device.

2. The grain spreading device of claim 1 wherein the support bracket is an L-shaped bracket having a vertical portion and a horizontal portion.

3. The grain spreading device of claim 2 wherein the horizontal portion of the bracket forms a strut adjacent a bottom of the guide.

4. The grain spreading device of claim 1 wherein a plurality of slots are formed on the outer periphery of the disc to receive the support bracket.

5. The grain spreading device of claim 1 wherein the shelf has laser cut knockouts to allow portions of the shelf to be broken off.

6. The grain spreading device of claim 1 wherein the disc is held in place with a pin.

* * * * *